United States Patent
Akamine et al.

(10) Patent No.: US 9,784,403 B2
(45) Date of Patent: Oct. 10, 2017

(54) HEAT INSULATOR

(71) Applicant: Covalent Materials Corporation, Shinagawa-ku, Tokyo (JP)

(72) Inventors: Shuko Akamine, Hadano (JP); Mitsuhiro Fujita, Hadano (JP)

(73) Assignee: COORSTEK KK, Tokyo (JP)

( * ) Notice: Subject to any disclaimer, the term of this patent is extended or adjusted under 35 U.S.C. 154(b) by 135 days.

(21) Appl. No.: 14/755,757

(22) Filed: Jun. 30, 2015

(65) Prior Publication Data
US 2016/0003401 A1    Jan. 7, 2016

(30) Foreign Application Priority Data

| Jul. 2, 2014 | (JP) | 2014-137125 |
| Jul. 4, 2014 | (JP) | 2014-138234 |
| Jul. 9, 2014 | (JP) | 2014-141112 |
| Jul. 30, 2014 | (JP) | 2014-154414 |
| Nov. 19, 2014 | (JP) | 2014-234467 |
| Dec. 10, 2014 | (JP) | 2014-249484 |
| Dec. 22, 2014 | (JP) | 2014-258681 |

(51) Int. Cl.
| C04B 38/00 | (2006.01) |
| C04B 38/06 | (2006.01) |
| F16L 59/02 | (2006.01) |
| C04B 35/44 | (2006.01) |
| C04B 35/443 | (2006.01) |
| C04B 35/80 | (2006.01) |

(52) U.S. Cl.
CPC ............ *F16L 59/028* (2013.01); *C04B 35/44* (2013.01); *C04B 35/443* (2013.01); *C04B 35/803* (2013.01); *C04B 2235/3262* (2013.01); *C04B 2235/3272* (2013.01); *C04B 2235/3279* (2013.01); *C04B 2235/3284* (2013.01); *C04B 2235/526* (2013.01); *C04B 2235/5224* (2013.01); *C04B 2235/5228* (2013.01); *C04B 2235/5264* (2013.01); *C04B 2235/72* (2013.01); *C04B 2235/763* (2013.01); *C04B 2235/79* (2013.01); *C04B 2235/9607* (2013.01)

(58) Field of Classification Search
CPC ...... F16L 59/028; C04B 33/44; C04B 33/443; C04B 33/803
See application file for complete search history.

(56) References Cited

U.S. PATENT DOCUMENTS 9,139,448 B2 *  9/2015  Akamine ................ C01F 7/162
2014/0112861 A1   4/2014  Akamine et al.

FOREIGN PATENT DOCUMENTS

| CN | 103449830 A | 12/2013 |
| CN | 103771851 A | 5/2014 |
| JP | S62-216974 A | 9/1987 |
| JP | H05-186280 A | 7/1993 |
| JP | 10-226582 A | 8/1998 |
| JP | 2012-229139 A | 11/2012 |
| JP | 2013-209278 A | 10/2013 |
| KR | 10-2014-0051051 A | 4/2014 |

OTHER PUBLICATIONS

Office Action issued by the Chinese Patent Office in corresponding Chinese Patent Application No. 201510380277.6 dated Feb. 4, 2014 (20 pages including partial English translation).
Notification of Reasons for Refusal issued by the Korean Patent Office in corresponding Korean Patent Application No. 10-2015-0094103 dated Mar. 24, 2017 (8 pages including partial English translation).
Notification of Reasons for Refusal issued by the Japanese Patent Office in corresponding Japanese Patent Application No. 2014-249484 dated Jun. 7, 2017 (6 pages including partial English translation).

* cited by examiner

*Primary Examiner* — Carol M Koslow
(74) *Attorney, Agent, or Firm* — Buchanan, Ingersoll & Rooney PC

(57) ABSTRACT

One aspect of the heat insulator of the present invention includes a porous sintered body having a porosity of 70 vol % or more and less than 91 vol %, and pores having a pore size of 0.8 μm or more and less than 10 μm occupy 10 vol % or more and 70 vol % or less of the total pore volume, while pores having a pore size of 0.01 μm or more and less than 0.8 μm occupy 5 vol % or more and 30 vol % or less of the total pore volume. The porous sintered body is formed from an $MgAl_2O_4$ (spinel) raw material and fibers formed of an inorganic material, the heat conductivity of the heat insulator at 1000° C. or more and 1500° C. or less is 0.40 W/(m·K) or less, and the weight ratio of Si relative to Mg in the porous sintered body is 0.15 or less.

11 Claims, 3 Drawing Sheets

HEAT INSULATOR

BACKGROUND OF THE INVENTION

Technical Field

The present invention relates to a heat insulator. The invention particularly relates to a heat insulator including a porous sintered body formed of $MgAl_2O_4$ and having excellent heat-insulating properties in a temperature region of 1000° C. or more. That is, the present invention relates to a heat insulator including a spinel porous sintered body.

Description of the Related Art

As a material for a heat insulator whose increase in heat conductivity in a high temperature region of 1000° C. or more is suppressed, which also has excellent heat resistance, a magnesia spinel ceramic porous body has been attracting attention.

JP 2012-229139 A (Patent Document 1) and JP 2013-209278 A (Patent Document 2) disclose that when a spinel ceramic porous body has a predetermined pore size distribution, heat conduction and radiant heat transmission can be suppressed, and that such a porous body can thus be used as a heat insulator having excellent heat resistance even at a high temperature of 1000° C. or more.

However, although the spinel ceramic porous body described in Patent Documents 1 and 2 has low heat conductivity at 1000° C. or more, which is a higher temperature than before, and also has excellent heat resistance, because of its high porosity, strength has been insufficient.

In order to improve strength, generally, a technique of reducing porosity to increase bulk specific gravity is employed. However, in the heat insulator described in Patent Documents 1 and 2, the simple reduction of porosity results in an increase in heat conductivity and also an increase in bulk specific gravity. Therefore, the demand for a heat insulator that has low heat conductivity and also is lightweight and easy to handle has not been sufficiently met.

Meanwhile, in recent years, a heat insulator whose increase in heat conductivity is suppressed even in a high temperature region of 1000° C. or more, which also is lightweight and has high strength, tends to be required.

As an example of a lightweight and high-strength heat insulator, a composite material including a heat insulator formed of a porous body and a material containing fibers is known.

For example, JP 10-226582 A (Patent Document 3) describes the invention of a multilayer heat insulator that can be used in a temperature region of more than about 1500° C., is produced in a simple manner, and has excellent mechanical characteristics and heat resistance. The multilayer heat insulator includes the following three layers (A), (B), and (C): (A) a heat-resistant layer including 75 to 95 wt % mullite fibers and 5 to 25 wt % silica fibers, (B) an intermediate layer, and (C) a heat-insulating layer including 15 to 35 wt % mullite fibers and 65 to 85 wt % silica fibers, and also includes a vitreous boron compound that fixes the entanglement points of the fibers to form a three-dimensional network.

In the case where the spinel ceramic porous body described in Patent Documents 1 and 2 is applied to the invention described in Patent Document 3, when high strength is to be ensured while maintaining the excellent heat-insulating properties at high temperatures, the heat insulator becomes heavy in weight. In addition, the ease of handling, that is, handleability at the time of working, has also been insufficient. In addition, an increase in weight results in increased volumetric specific heat, whereby an increased amount of heat may be required to raise the temperature of the heat insulator.

SUMMARY OF THE INVENTION

In order to solve the technical problems mentioned above, the present inventors have found that when a heat insulator includes an $MgAl_2O_4$ ceramic sintered body having a porosity of 85 vol % or more and less than 91 vol %, in which pores having a pore size of 0.8 μm or more and less than 10 μm occupy 10 vol % or more and 40 vol % or less of the total pore volume, while pores having a pore size of 0.01 μm or more and less than 0.8 μm occupy 5 vol % or more and 10 vol % or less of the total pore volume, such a heat insulator maintains excellent heat-insulating properties, whose increase in heat conductivity is suppressed even at a high temperature of 1000° C. or more, and also has excellent lightweight properties, and they have previously proposed the finding as Patent Application No. 2014-249484.

Further, as a result of extensive research, they have found that when Si is contained in an $MgAl_2O_4$ ceramic sintered body, this results in increased contraction in the course of use at high temperatures (increased after-contraction), whereby low heat conductivity cannot be obtained, and excellent heat resistance cannot be obtained. They have thus conceived of the present invention. Incidentally, the Si is present as an impurity in the $MgAl_2O_4$ ceramic sintered body or contained in a ceramic reinforcing material for reinforcing the ceramic sintered body.

In light of the technical problems mentioned above, an object of the present invention is to provide a heat insulator that maintains excellent heat-insulating properties, whose increase in heat conductivity is suppressed even at a high temperature of 1000° C. or more, and also has excellent lightweight properties. That is, an object of the present invention is to provide a heat insulator (composite insulator) that has excellent heat-insulating properties at high temperatures, is lightweight with low volumetric specific heat, and has excellent handleability.

A heat insulator according to one aspect of the present invention includes a porous sintered body having a porosity of 70 vol % or more and less than 91 vol %,
pores having a pore size of 0.8 μm or more and less than 10 μm occupying 10 vol % or more and 70 vol % or less of the total pore volume, while pores having a pore size of 0.01 μm or more and less than 0.8 μm occupying 5 vol % or more and 30 vol % or less of the total pore volume,
the porous sintered body being formed from an $MgAl_2O_4$ (spinel) raw material and fibers formed of an inorganic material,
the heat conductivity of the heat insulator at 1000° C. or more and 1500° C. or less being 0.40 W/(m·K) or less,
the weight ratio of Si relative to Mg in the porous sintered body being 0.15 or less.

It is preferable that the weight ratio of Si relative to Mg in the porous sintered body is 0.0001 or less.

It is preferable that the heat insulator includes an $MgAl_2O_4$ ceramic sintered body, the porosity is 85 vol % or more and less than 91 vol %, and pores having a pore size of 0.8 μm or more and less than 10 μm occupy 10 vol % or more and 40 vol % or less of the total pore volume, while pores having a pore size of 0.01 μm or more and less than 0.8 μm occupy 5 vol % or more and 10 vol % or less of the total pore volume.

It is also preferable that the heat insulator includes an $MgAl_2O_4$ ceramic porous body, which is a porous sintered body having a porosity of 70 vol % or more and less than 85 vol %, and pores having a pore size of 0.8 μm or more and less than 10 μm occupy 40 vol % or more and 70 vol % or less of the total pore volume, while pores having a pore size of 0.01 μm or more and less than 0.8 μm occupy 10 vol % or more and 30 vol % or less of the total pore volume.

In the heat insulator according to one aspect of the present invention, because the weight ratio of Si relative to Mg in the sintered body is 0.15 or less in this manner, after-contraction at 1600° C. is reduced, and a predetermined pore size distribution can be maintained. That is, a predetermined pore size distribution can be maintained, and low heat conductivity and excellent heat resistance can be obtained. Further, when the weight ratio of Si relative to Mg in the sintered body is 0.0001 or less, after-contraction at 1700° C. can be reduced.

It is preferable that the inorganic material is a ceramic reinforcing material. It is also preferable that the ceramic reinforcing material is ceramic fibers.

Incidentally, the amount of ceramic reinforcing material to be added is 0.5 wt % or more and less than 60 wt %, more preferably 5 wt % or more and 50 wt % or less, relative to the weight of solids other than the ceramic reinforcing material. When the ceramic reinforcing material having a silica content of 5 wt % or less is added in a predetermined amount, a heat insulator having excellent heat resistance and heat-insulating properties can be obtained.

Incidentally, the lower the heat conductivity of the heat insulator at high temperatures, the higher the resulting heat-insulating effect. Accordingly, the heat conductivity at 1000° C. or more and 1500° C. or less is 0.40 W/(m·K) or less. In addition, with respect to the after-contraction of the heat insulator, it is preferable that contraction after holding at 1600° C. for 12 hours is 2% or less. In the case where the weight ratio of Si relative to Mg in the sintered body is 0.0001 or less, it is preferable that contraction after holding at 1700° C. for 12 hours is 2% or less.

A heat insulator according to another aspect of the present invention includes a porous sintered body having a porosity of 70% or more,
the porous sintered body including a spinel sintered body formed from an $MgAl_2O_4$ (spinel) raw material and a fibrous layer formed from fibers formed of an inorganic material on at least one surface of the spinel sintered body,
the porous sintered body having pores having a pore size of more than 1000 μm in a proportion of 10 vol % or less of all the pores,
pores having a pore size of 0.8 μm or more and less than 10 μm occupying 50 vol % or more and 80 vol % or less of the pores having a pore size of 1000 μm or less, while pores having a pore size of 0.01 μm or more and less than 0.8 μm occupying 10 vol % or more and 30 vol % or less of the pores having a pore size of 1000 μm or less,
the fibers in the fibrous layer having a silica component content of 55 wt % or less,
the heat conductivity of the heat insulator at 1000° C. or more and 1500° C. or less being 0.40 W/(m·K) or less.

That is, the heat insulator according to another aspect of the present invention includes:
a porous sintered body in which the spinel material represented by the chemical formula $XAl_2O_4$ is $MgAl_2O_4$; and
a fibrous layer containing an aggregate of fibers formed of an inorganic material formed on at least one surface of the porous sintered body,
the porous sintered body having a porosity of 70% or more,
the porous sintered body having pores having a pore size of more than 1000 μm in a proportion of 10 vol % or less of all the pores,
pores having a pore size of 0.01 μm or more and less than 0.8 μm occupying 10 vol % or more and 30 vol % or less of the pores having a pore size of 1000 μm or less, while pores having a pore size of 0.8 μm or more and less than 10 μm occupying 50 vol % or more and 80 vol % or less of the pores having a pore size of 1000 μm or less,
the fibers in the fibrous layer having a silica component content of 55 wt % or less,
the heat conductivity of the heat insulator at 1000° C. or more and 1500° C. or less being 0.40 W/(m·K) or less.

As a result of the above configuration, a heat insulator that has excellent heat-insulating properties at high temperatures, is lightweight with low volumetric specific heat, and has excellent handleability can be achieved.

A heat insulator according to still another aspect of the present invention includes a porous sintered body having a porosity of 85 vol % or more and less than 91 vol %,
the porous sintered body being formed from an $MgAl_2O_4$ (spinel) raw material and ceramic fibers (ceramic fibers are contained in $MgAl_2O_4$ (spinel)),
pores having a pore size of 0.8 μm or more and less than 10 μm occupying 10 vol % or more and 40 vol % or less of the total pore volume, while pores having a pore size of 0.01 μm or more and less than 0.8 μm occupying 5 vol % or more and 10 vol % or less of the total pore volume,
the heat conductivity of the heat insulator at 1000° C. or more and 1500° C. or less being 0.40 W/(m·K) or less,
the bulk specific gravity of the heat insulator being 0.6 or less.

As a result of the above configuration, it becomes possible to provide a heat insulator that maintains low heat conductivity and also is lightweight.

In addition, the more an increase in heat conductivity at high temperatures is suppressed, the higher the heat-insulating effect in a high temperature region can be. Accordingly, it is preferable that the heat conductivity at 1000° C. or more and 1500° C. or less is not more than 1.5 times the heat conductivity at 20° C. or more and 1000° C. or less.

A heat insulator according to yet another aspect of the present invention includes a porous sintered body having a porosity of 70 vol % or more and less than 85 vol %,
the porous sintered body being formed from an $MgAl_2O_4$ (spinel) raw material and ceramic fibers (ceramic fibers are contained in $MgAl_2O_4$ (spinel)),
pores having a pore size of 0.8 μm or more and less than 10 μm occupying 40 vol % or more and less than 70 vol % of the total pore volume, while pores having a pore size of 0.01 μm or more and less than 0.8 μm occupying 10 vol % or more and less than 30 vol % of the total pore volume,
the heat conductivity of the heat insulator at 1000° C. or more and 1500° C. or less being not more than 1.5 times the heat conductivity at 20° C. or more and less than 1000° C.

As a result of the above configuration, it becomes possible to provide a heat insulator that is lightweight, whose increase in heat conductivity in a high temperature region is more suppressed.

The lower the heat conductivity of the heat insulator at high temperatures, the higher the resulting heat-insulating effect. Accordingly, it is preferable that the heat conductivity at 1000° C. or more and 1500° C. or less is 0.40 W/(m·K) or less, more preferably 0.35 W/(m·K) or less.

In addition, the more an increase in heat conductivity at high temperatures is suppressed, the higher the heat-insulating effect in a high temperature region can be. Accordingly, it is preferable that the heat conductivity at 1000° C. or more and 1500° C. or less is not more than 1.2 times the heat conductivity at 20° C. or more and 1000° C. or less.

In a heat insulator according to an aspect of the present invention, an increase in heat conductivity is suppressed even at a high temperature of 1000° C. or more, whereby excellent heat-insulating properties are maintained, and the heat insulator is also lightweight and easy to handle. Further, the volumes of pores having different pore sizes are appropriately controlled, whereby heat conductivity and lightweight properties can be optimized according to the intended use, and this is more preferable.

The present invention makes it possible to provide a heat insulator that has excellent heat-insulating properties at high temperatures, is lightweight with low volumetric specific heat, and has excellent handleability.

DESCRIPTION OF THE EMBODIMENTS

Figure 1:
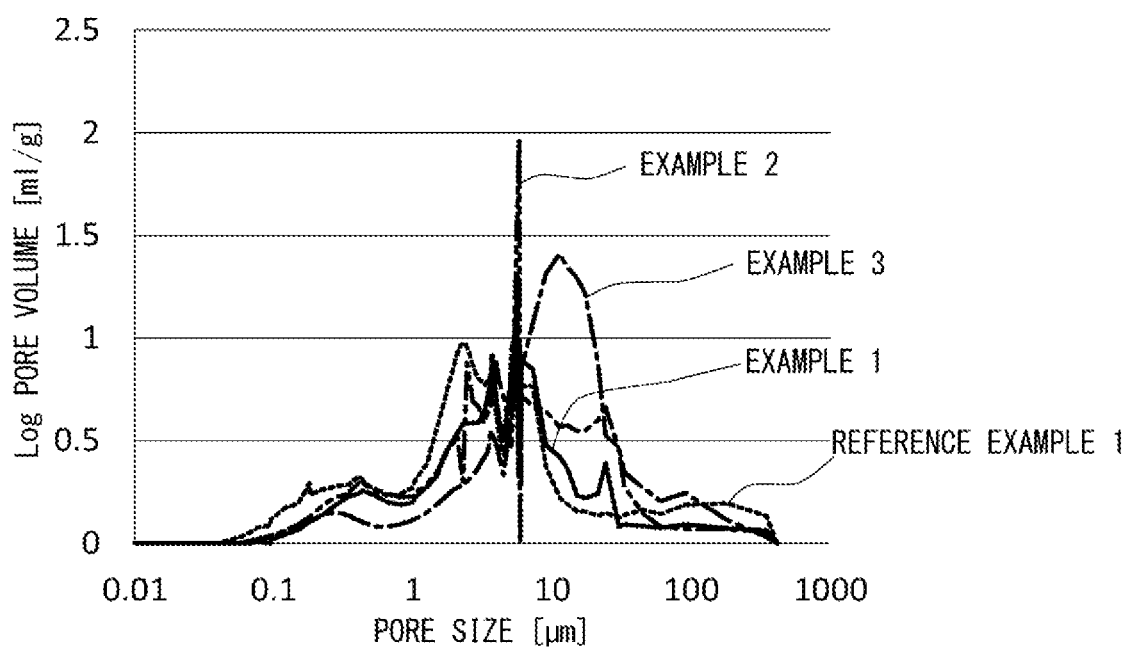
FIG. 1 is a figure showing the pore size distribution of each porous sintered body measured by a mercury porosimeter in Examples 1 to 3 according to the present invention and Reference Example 1.

Hereinafter, heat insulators according to some embodiments of the present invention will be described.

A heat insulator according to one aspect of the present invention includes a porous sintered body having a porosity of 70 vol % or more and less than 91 vol %, and pores having a pore size of 0.8 μm or more and less than 10 μm occupy 10 vol % or more and 70 vol % or less of the total pore volume, while pores having a pore size of 0.01 μm or more and less than 0.8 μm occupy 5 vol % or more and 30 vol % or less of the total pore volume. The porous sintered body is formed from an $MgAl_2O_4$ (spinel) raw material and fibers formed of an inorganic material, the heat conductivity of the heat insulator at 1000° C. or more and 1500° C. or less is 0.40 W/(m·K) or less, and the weight ratio of Si relative to Mg in the porous sintered body is 0.15 or less. Herein, "the weight ratio of Si relative to Mg" means if Mg weighs 1 g, the amount of Si is 0.15 g or less.

It is preferable that the weight ratio of Si relative to Mg in the porous sintered body is 0.0001 or less.

A heat insulator according to one preferred aspect of the present invention includes an $MgAl_2O_4$ ceramic sintered body. The porosity is 85 vol % or more and less than 91 vol %, and pores having a pore size of 0.8 μm or more and less than 10 μm occupy 10 vol % or more and 40 vol % or less of the total pore volume, while pores having a pore size of 0.01 μm or more and less than 0.8 μm occupy 5 vol % or more and 10 vol % or less of the total pore volume.

A heat insulator according to another preferred aspect of the present invention includes an $MgAl_2O_4$ ceramic porous body containing a reinforcing material, which is a porous sintered body having a porosity of 70 vol % or more and less than 85 vol %. Pores having a pore size of 0.8 μm or more and less than 10 μm occupy 40 vol % or more and less than 70 vol % of the total pore volume, while pores having a pore size of 0.01 μm or more and less than 0.8 μm occupy 10 vol % or more and less than 30 vol % of the total pore volume.

A material for the heat insulator according to the present invention is spinel $MgAl_2O_4$ (magnesia spinel). A spinel porous sintered body has small variations in the shape or size of pores resulting from the grain growth or grain-boundary bonding at high temperatures, and thus the suppressing effect on the variation of heat conductivity can be maintained for a long period of time.

In particular, $MgAl_2O_4$ has high structural stability in a high temperature region of 1000° C. or more and has an isotropic crystal structure. Therefore, even when exposed to high temperatures, it hardly undergoes the peculiar grain growth or contraction. Accordingly, $MgAl_2O_4$ is capable of maintaining the specific pore configuration, which is a feature of the present invention, and thus is suitable as a heat insulator for use at high temperatures. Incidentally, the chemical composition and the spinel structure can be measured and identified by powder X-ray diffractometry, for example.

In addition, the porous sintered body according to one aspect of the present invention has a porosity of 70 vol % or more and less than 91 vol %. When the porosity is less than 70 vol %, the proportion of the $MgAl_2O_4$ substrate in the porous sintered body is high, resulting in increased heat conduction, making it difficult to sufficiently reduce heat conductivity. Meanwhile, when the porosity is 91 vol % or more, the proportion of the $MgAl_2O_4$ substrate in the porous sintered body is absolutely low, making the sintered body extremely brittle. Thus, sufficient strength cannot be obtained.

The porosity is calculated in accordance with JIS R 2614, "Measurement Method for Specific Gravity and True Porosity of Insulating Firebrick".

In one preferred aspect of the porous sintered body, when the porosity is 85 vol % or more and less than 91 vol %, the pore configuration is such that pores having a pore size of 0.8 μm or more and less than 10 μm are 10 vol % or more and 40 vol % or less of the total pore volume, while pores having a pore size of 0.01 μm or more and less than 0.8 μm (hereinafter also referred to as "fine pores") are 5 vol % or more and 10 vol % or less of the total pore volume.

As a result of such a pore configuration, the porosity can be made 85 vol % or more while maintaining pores having a pore size of 0.01 μm or more and less than 0.8 μm, which are necessary for the suppression of heat conduction, and pores having a pore size of 0.8 μm or more and less than 10 μm, which are necessary for the suppression of radiant heat transmission. Because of the presence of pores having a pore size of 0.01 μm or more and less than 0.8 μm, heat conduction can be suppressed by phonon scattering. Because of the presence of pores having a pore size of 0.8 μm or more and less than 10 μm, radiant heat transmission can be suppressed by infrared scattering.

When the proportion of the fine pores in the total pore volume is less than 5 vol %, the number of pores per unit volume is so small that the suppressing effect on heat conduction may be insufficient. Meanwhile, when it is more than 10 vol %, it may be difficult to obtain a porosity of 85 vol % or more.

The porous sintered body herein may have a pore size distribution peak within a pore size range of more than 10 µm.

In another preferred aspect of the porous sintered body, when the porous sintered body has a porosity of 70 vol % or more and less than 85 vol %, pores having a pore size of 0.8 µm or more and less than 10 µm occupy 40 vol % or more and less than 70 vol % of the total pore volume, while pores having a pore size of 0.01 µm or more and less than 0.8 µm occupy 10 vol % or more and less than 30 vol % of the total pore volume.

When pores having a pore size of 0.8 µm or more and less than 10 µm are less than 40 vol % of the total pore volume, the suppressing effect on heat conduction may be low, while when it is 70 vol % or more, it may become difficult to obtain a porosity of 70 vol % or more. When pores having a pore size of 0.01 µm or more and less than 0.8 µm are less than 10 vol % of the total pore volume, it may be impossible to obtain a porosity of 70 vol % or more and the suppressing effect of infrared scattering on radiant heat transmission.

The pore size distribution in the porous sintered body is measured in accordance with JIS R 1655, "Test Method for Pore Size Distribution of Fine Ceramic Compact by Mercury Intrusion". Incidentally, bulk specific gravity (bulk density) is measured in accordance with JIS R 2614, "Measurement Method for Specific Gravity and True Porosity of Insulating Firebrick".

Incidentally, in a preferred embodiment of the present invention, as long as pores having a pore size of 0.8 µm or more and less than 10 µm occupy 10 vol % or more and 40 vol % or less of the total pore volume, while pores having a pore size of 0.01 µm or more and less than 0.8 µm occupy 5 vol % or more and 10 vol % or less of the total pore volume, or pores having a pore size of 0.8 µm or more and less than 10 µm occupy 40 vol % or more and less than 70 vol % of the total pore volume, while pores having a pore size of 0.01 µm or more and less than 0.8 µm occupy 10 vol % or more and less than 30 vol % of the total pore volume, pores of 10 µm or more may be included in each aspect.

Further, in the heat insulator according to the present invention, the weight ratio of Si relative to Mg is 0.15 or less.

When the weight ratio of Si relative to Mg is 0.15 or less in this manner, after-contraction is reduced (contraction in the course of use at high temperatures is suppressed), and a predetermined pore size distribution can be maintained. That is, a predetermined pore size distribution can be maintained, and low heat conductivity and excellent heat resistance can be obtained. Specifically, with respect to the after-contraction of the heat insulator according to the present invention, it is preferable that contraction after holding at 1600° C. for 12 hours is 2% or less. In addition, in the case where the weight ratio is 0.0001 or less, it is preferable that contraction after holding at 1700° C. for 12 hours is 2% or less.

In addition, it is preferable that the porous sintered body according to the present invention contains ceramic fibers as a ceramic reinforcing material. When ceramic fibers are contained in the porous sintered body, the porosity of the entire porous sintered body can be made high, resulting in a decrease in bulk specific gravity, whereby weight reduction can be achieved. In addition, as compared with the case where only porosity is increased without adding fibers, strength improvement can also be achieved.

As ceramic fibers, a wide variety of known materials used for heat insulators can be applied. Examples thereof include alumina, zirconia, and alumina-silica. However, materials that are oxidized and decomposed in a high-temperature atmosphere and materials that are oxidized in a high-temperature atmosphere, such as silicon carbide, are not necessarily preferable (are not quite preferable).

The ceramic fibers are not particularly limited in shape either. For example, it is possible to contain staple fibers having an average diameter of 3 to 10 µm and an average length of 0.2 to 100 mm, a fiber bundle formed of hundreds to thousands of such staple fibers, or continuous filaments. However, in terms of maintaining the porosity within the range of the present invention, a configuration in which the staple fibers are dispersed is preferable.

The addition rate of ceramic fibers is not particularly limited. However, when it is too low, the reducing effect on bulk specific gravity may be hardly obtained. Meanwhile, when it is too high, the proportion of pores having a pore size of 0.01 µm or more and less than 0.8 µm and pores having a pore size of 0.8 µm or more and less than 10 µm in all the pores decreases, whereby the suppressing effect on an increase in heat conductivity mentioned below may not be sufficiently obtained.

In addition, it is preferable that the ceramic fibers have a silica content of 5 wt % or less, and it is preferable that they are added in an amount of 0.5 wt % or more and less than 60 wt % of the sintered body. When the ceramic fibers have a silica content of 5 wt % or less, and they are added in an amount of 0.5 wt % or more and less than 60 wt % of the sintered body in this manner, the weight ratio of Si relative to Mg in the sintered body can be made 0.15 or less.

That is, when a ceramic reinforcing material having a silica content of 5 wt % or less is added in an amount of 0.5 wt % or more and less than 60 wt % of the sintered body, a heat insulator having excellent heat resistance and heat-insulating properties can be obtained.

In addition, the distribution of ceramic fibers in $MgAl_2O_4$ can also be suitably adjusted according to the required specification of the designed heat insulator. For example, when the fiber density is made high in the surface layer and low in the core part, the surface layer has high strength, and thus the resulting heat insulator is less likely to lose its shape.

As shown above as one preferred aspect, in the pore configuration where ceramic fibers are contained in $MgAl_2O_4$, the porosity is 85 vol % or more and less than 91 vol %, and pores having a pore size of 0.8 µm or more and less than 10 µm are 10 vol % or more and 40 vol % or less of the total pore volume, while pores having a pore size of 0.01 µm or more and less than 0.8 µm are 5 vol % or more and 10 vol % or less of the total pore volume, because of the presence of the ceramic fibers, weight reduction can be achieved without a decrease in strength, that is, the bulk specific gravity is reduced.

Further, when the ceramic fibers have a silica content of 5 wt % or less, and they are added in an amount of 0.5 wt % or more and less than 60 wt % of the sintered body, the weight ratio of Si relative to Mg in the sintered body can be made 0.15 or less. Thus, after-contraction is reduced (contraction in the course of use at high temperatures is suppressed), and a predetermined pore size distribution can be maintained. As a result, a predetermined pore size distribution can be maintained, and low heat conductivity and excellent heat resistance can be obtained.

Further, with respect to the heat conductivity of the heat insulator, specifically, it is preferable that the heat conductivity of the heat insulator at 1000° C. or more and 1500° C. or less is not more than 1.5 times the heat conductivity at 20° C. or more and less than 1000° C.

In such a heat insulator whose increase in heat conductivity in a high temperature region is suppressed, the heat-insulating effect of the same level as in a low temperature region of less than 1000° C. can be maintained also in a high temperature region of 1000° C. or more.

The heat conductivity of the heat insulator at 1000° C. or more and 1500° C. or less is 0.40 W/(m·K) or less. In such a heat insulator whose heat conductivity does not increase and is suppressed even in a high temperature region of 1000° C. or more, the heat-insulating effect does not vary much even when used in a high temperature region.

Incidentally, methods for producing the above heat insulator according to the present invention are not particularly limited, and known porous sintered body production methods can be applied. For example, the pore structure can be formed/adjusted by adding a pore-forming material or a foaming agent, etc.

In addition, various modifications can be made to the heat insulator according to the present invention as long as there is no adverse effect, such as the significant deterioration of heat-insulating characteristics. For example, fibers formed of a plurality of materials may be added. In addition, fine particles may be further added. Alternatively, a region having no fiber may be provided in part. Further, it is also possible to provide various membranes on the surface layer of the heat insulator according to the present invention, thereby further improving the heat resistance.

A heat insulator according to the present invention includes a porous sintered body having a porosity of 70% or more. The porous sintered body includes a spinel sintered body formed from an $MgAl_2O_4$ (spinel) raw material and a fibrous layer formed from fibers formed of an inorganic material on at least one surface of the spinel sintered body. The porous sintered body has pores having a pore size of more than 1000 µm in a proportion of 10 vol % or less of all the pores, and
pores having a pore size of 0.8 µm or more and less than 10 µm occupy 50 vol % or more and 80 vol % or less of the pores having a pore size of 1000 µm or less, while pores having a pore size of 0.01 µm or more and less than 0.8 µm occupy 10 vol % or more and 30 vol % or less of the pores having a pore size of 1000 µm or less. The fibers in the fibrous layer have a silica component content of 55 wt % or less, and the heat conductivity of the heat insulator at 1000° C. or more and 1500° C. or less is 0.40 W/(m·K) or less.

In other words, the heat insulator according to the present invention includes: a porous sintered body that is a spinel material formed from an $MgAl_2O_4$; and a fibrous layer containing an aggregate of fibers formed of an inorganic material formed on at least one surface of the porous sintered body. The porous sintered body has a porosity of 70% or more. The porous sintered body has pores having a pore size of more than 1000 µm in a proportion of 10 vol % or less of all the pores, and pores having a pore size of 0.01 µm or more and less than 0.8 µm occupy 10 vol % or more and 30 vol % or less of the pores having a pore size of 1000 µm or less, while pores having a pore size of 0.8 µm or more and less than 10 µm occupy 50 vol % or more and 80 vol % or less of the pores having a pore size of 1000 µm or less. The fibers in the fibrous layer have a silica component content of 55 wt % or less, and the heat conductivity of the heat insulator at 1000° C. or more and 1500° C. or less is 0.40 W/(m·K) or less.

A magnesia spinel, that is to say, $MgAl_2O_4$, has small variations in the shape or size of pores resulting from the grain growth or grain-boundary bonding at high temperatures, and thus the suppressing effect on the variation of heat conductivity can be maintained for a long period of time. Therefore, it is suitable for use at high temperatures. Incidentally, the chemical composition and the spinel structure can be measured and identified by powder X-ray diffractometry, for example.

The porous sintered body has a porosity of 70% or more, the porous sintered body having a pore size of more than 1000 µm in a proportion of 10 vol % or less of all the pores, and pores having a pore size of 0.01 µm or more and less than 0.8 µm occupy 10 vol % or more and 30 vol % or less of the pores having a pore size of 1000 µm or less, while pores having a pore size of 0.8 µm or more and less than 10 µm occupy 50 vol % or more and 80 vol % or less of the pores having a pore size of 1000 µm or less.

Porosity is calculated in accordance with JIS R 2614, "Measurement Method for Specific Gravity and True Porosity of Insulating Firebrick". Further, pore volume proportions can be calculated from the pore size distribution. The pore size distribution can be measured in accordance with JIS R 1655, "Test Method for Pore Size Distribution of Fine Ceramic Compact by Mercury Intrusion".

When the porosity of the porous sintered body is less than 70%, the solid proportion is high. This may result in increased heat conduction, leading to an increase in heat conductivity. Incidentally, when the porosity is too high, this results in a significant decrease in strength. Therefore, the upper limit of the porosity is preferably 88%.

In the porous sintered body, when too many pores having a pore size of more than 1000 µm, so-called giant pores, are present, the temperature dependency of heat conductivity may increase. Thus, when the pores having a pore size of more than 1000 µm are 10 vol % or less of all the pores, their influence can be suppressed to a level that causes no practical problem.

When pores having a pore size of 0.01 µm or more and less than 0.8 µm, so-called fine pores, are 10 vol % or more and 30 vol % or less of the pores having a pore size of 1000 µm or less, the number of pores per unit volume can be increased. As a result, the amount of phonon scattering at the grain boundary increases, whereby the suppressing effect on heat conduction can be obtained.

When the proportion of the fine pores is less than 10 vol %, the number of grain boundaries per unit volume is so small that the suppressing effect on heat conduction may be insufficient. Meanwhile, when the proportion of the fine pores is more than 30 vol %, it becomes difficult to achieve a porosity of 70% or more, and this may result in high heat conductivity.

In the porous sintered body according to the present invention, pores having a pore size of 0.8 µm or more and less than 10 µm occupy 50 vol % or more and 80 vol % or less of pores having a pore size of 1000 µm or less. When the fine pores are within the range of the present invention, and also an appropriate amount of pores of 0.8 µm or more and 10 µm or less, which are suitable for the suppression of radiant heat transmission, are present, an increase in heat conductivity at high temperatures is effectively suppressed as a whole.

The pore volume proportion for each pore size mentioned above has been determined considering the formation of a fibrous layer on the surface. It can be said that thus, a significant decrease in heat-insulating properties at high temperatures due to an increase in radiant heat transmission caused by the application of a fibrous layer is suppressed, and the original characteristics of the porous sintered body of the present invention are maintained.

In the present invention, the fibers in the fibrous layer have a silica component content of 55 wt % or less.

The fibrous layer effectively compensates for the shortage of toughness and lightweight properties, which are the weak points of the porous sintered body in the present invention, without impairing the heat-insulating characteristics at high temperatures.

The porous sintered body in the present invention is excellent in terms of heat-insulating characteristics at high temperatures. However, when the porous sintered body is shaped into a plate, for example, there are concerns about a problem that damages such as cracking, chipping, and breaking may occur at the time of carrying or at the time of working, including the stacking operation in a furnace body, etc., and other various operations.

In order to deal with such a problem, it is possible to employ a method that improves the strength of the porous sintered body itself. In this case, with an increase in bulk density, lightweight properties are impaired, whereby operability at the time of working may decrease. In the present invention, for convenience, operability at the time of working is called "handleability".

In addition, the above method is aimed at improving the strength as a so-called bulk body. Therefore, for example, in the case of a plate-shaped material, when strong tensile stress occurs on the surface layer part of the porous sintered body due to bending under its own weight, cracking or the like occurs in the surface layer part, whereby the porous sintered body, which is a brittle material, is easily damaged.

Thus, a method that forms a layer for reinforcement on the surface layer part of a porous sintered body is possible. According to this method, unless the layer is made too thick, the risk of damage as mentioned above can be reduced while suppressing an increase in the entire bulk density. In addition, the layer also serves to protect the surface layer, and thus the method is also effective in preventing the formation of scratches or chipping.

However, although the porous sintered body according to the present invention is advantageous in that it has excellent heat-insulating properties at high temperatures because of the specific pore volume proportions of the pore sizes, the simple formation of a layer on the surface layer thereof may impair the advantageous heat-insulating properties at high temperatures.

Thus, in the present invention, together with the optimization of the pore volume proportions in the porous sintered body, a material containing fibers that are particularly resistant to tension is used to form a layer on the surface layer. As a result, the heat insulator has heat-insulating properties at high temperatures, lightweight properties, handleability, and high toughness.

The formation on at least one surface of the porous sintered body herein means that it is not indispensable to cover the entire surface of the porous sintered body with the fibrous layer. Depending on the shape or use of the heat insulator, it is difficult to cover the entire surface. However, as long as the fibrous layer is provided within a range where the advantages of the present invention are obtained, there is no particular restriction.

In the case of a plate, it may be configured such that at least one principal surface is covered with the fibrous layer. In the case of a block body, it is possible that only the face to be handled is covered with the fibrous layer.

For the fibers formed of an inorganic material, a wide variety of known inorganic materials applicable to heat insulators or refractories may be used, and there is no particular restriction. Examples thereof include alumina, mullite, and zirconia.

In addition, the fiber configuration is not particularly limited either, and may be suitably selected according to the purpose of use or the intended use. Examples thereof include a dispersion of so-called staple fibers in a matrix, a sheet or woven fabric of filaments, and a composite of staple fibers and filaments.

The fibrous layer containing an aggregate of fibers formed of an inorganic material contains fibers formed of an inorganic material as an indispensable constituent and may also suitably contain other materials as constituents. For example, when a layer cannot be formed from fibers alone, a suitable inorganic material is selected as a matrix. In addition, it is also possible to further form a membrane on the surface of a fibrous layer to improve the heat resistance and corrosion resistance.

As above mentioned, in the present invention, although the configuration of the fibrous layer is not particularly limited, the fibers in the fibrous layer have a silica component content of 55 wt % or less. This is because when the silica component content is more than 55 wt %, the reaction between the spinel material of the porous sintered body and silica in the fibers becomes too large to ignore, resulting in an increased risk of the separation of the fibrous layer.

Incidentally, almost all known fibers formed of an inorganic material and applicable to heat insulators or refractories contain a silica component. Accordingly, in the present invention, in order to avoid the problems due to an excessive amount of silica component as mentioned above, the proportion of silica in the fibers is limited.

The thickness of the fibrous layer is not particularly limited either. However, in the case of a plate-shaped heat insulator, for example, when the proportion of the fibrous layer in the whole thickness is high, heat-insulating properties at high temperatures are impaired. Therefore, the thickness is suitably designed to balance with handleability.

In addition, materials other than the porous sintered body and the fibrous layer may further be contained without interfering with the advantages of the present invention. For example, fibers or the like may be added to the porous sintered body as a reinforcing material. The reinforcing material may be the same material as or a different material from the porous sintered body according to the present invention. In addition, in the above, a known pore-making material may also be added.

Incidentally, in the heat insulator according to the present invention, when the heat conductivity in a temperature region of 1000° C. or more and 1500° C. or less is less than 0.4 W/(m·K), the influence of a decrease in heat-insulating properties due to the application of the fibrous layer can be minimized, and it can be said that this is more preferable.

A heat insulator according to one aspect of the present invention includes a porous sintered body having a porosity of 85 vol % or more and less than 91 vol %, and pores having a pore size of 0.8 μm or more and less than 10 μm occupy 10 vol % or more and 40 vol % or less of the total pore volume, while pores having a pore size of 0.01 μm or more and less than 0.8 μm occupy 5 vol % or more and 10 vol % or less of the total pore volume. The porous sintered body is formed from an $MgAl_2O_4$ (spinel) raw material and ceramic fibers (ceramic fibers are contained in $MgAl_2O_4$). The heat conductivity of the heat insulator at 1000° C. or more and 1500° C. or less is 0.40 W/(m·K) or less, and the bulk specific gravity of the heat insulator is 0.6 or less.

A material for the porous sintered body according to the present invention is spinel $MgAl_2O_4$ (magnesia spinel). A spinel porous sintered body has small variations in the shape or size of pores resulting from the grain growth or grain-boundary bonding at high temperatures, and thus the suppressing effect on the variation of heat conductivity can be maintained for a long period of time.

In particular, $MgAl_2O_4$ has high structural stability in a high temperature region of 1000° C. or more and has an isotropic crystal structure. Therefore, even when exposed to high temperatures, it hardly undergoes the peculiar grain growth or contraction.

Accordingly, $MgAl_2O_4$ is capable of maintaining the specific pore configuration, which is a feature of the present invention, and thus is suitable as a heat insulator for use at high temperatures. Incidentally, the chemical composition and the spinel structure can be measured and identified by powder X-ray diffractometry, for example.

Further, the porous sintered body according to the present invention contains ceramic fibers. When ceramic fibers are contained in $MgAl_2O_4$, the porosity of the entire porous sintered body can be made high, resulting in a decrease in bulk specific gravity, whereby weight reduction can be achieved. In addition, as compared with the case where only porosity is increased without adding fibers, strength improvement can also be achieved.

As ceramic fibers, a wide variety of known materials used for heat insulators can be applied. Examples thereof include alumina, zirconia, and mullite. However, materials that are oxidized and decomposed in a high-temperature atmosphere and become unusable, such as silicon carbide, are not necessarily preferable (are not quite preferable).

The ceramic fibers are not particularly limited in shape either. For example, it is possible to contain staple fibers having an average diameter of 3 to 10 μm and an average length of 0.2 to 100 mm, a fiber bundle formed of hundreds to thousands of such staple fibers, or continuous filaments. However, in terms of maintaining the porosity within the range of the present invention, a configuration in which the staple fibers are dispersed is preferable.

The addition rate of ceramic fibers is not particularly limited. However, when it is too low, the reducing effect on bulk specific gravity may be hardly obtained. Meanwhile, when it is too high, the proportion of pores having a pore size of 0.01 μm or more and less than 0.8 μm and pores having a pore size of 0.8 μm or more and less than 10 μm in all the pores decreases, whereby the suppressing effect on an increase in heat conductivity mentioned below may not be sufficiently obtained.

Incidentally, according to one aspect of the present invention, when pores having a pore size of 0.8 μm or more and less than 10 μm occupy 10 vol % or more and 40 vol % or less of the total pore volume, while pores having a pore size of 0.01 μm or more and less than 0.8 μm occupy 5 vol % or more and 10 vol % or less of the total pore volume, pores of 1000 μm or more may be included.

It is preferable that the addition rate of ceramic fibers is 0.05 vol % or more and 35 vol % or less, more preferably 0.1 vol % or more and 30 vol % or less, based on the porous sintered body.

Incidentally, the content of ceramic fibers is adjusted by the weight ratio between the ceramic fibers and solids other than the ceramic fibers. In terms of the amount added, it is 0.5 wt % or more and 75 wt % or less, more preferably 5 wt % or more and 60 wt % or less.

In addition, the distribution of ceramic fibers in $MgAl_2O_4$ can also be suitably adjusted according to the required specification of the designed heat insulator. For example, when the fiber density is made high in the surface layer and low in the core part, the surface layer has high strength, and thus the resulting heat insulator is less likely to lose its shape.

In addition, the porous sintered body according to one aspect of the present invention has a porosity of 85 vol % or more and less than 91 vol %. When the porosity is less than 85 vol %, the proportion of the $MgAl_2O_4$ substrate in the porous sintered body is high, resulting in increased heat conduction, and this may make it difficult to sufficiently reduce heat conductivity. Meanwhile, when the porosity is 91 vol % or more, the proportion of the $MgAl_2O_4$ substrate in the porous sintered body is absolutely low, making the sintered body extremely brittle. Thus, sufficient heat resistance may not be obtained.

The porosity is calculated in accordance with JIS R 2614, "Measurement Method for Specific Gravity and True Porosity of Insulating Firebrick".

The pore configuration of the porous sintered body is such that pores having a pore size of 0.8 μm or more and less than 10 μm occupy 10 vol % or more and 40 vol % or less of the total pore volume.

Most of the pores of the porous sintered body are small pores having a pore size of less than 10 μm. In the case where there are a large number of pores having a pore size of 10 μm or more, the infrared scattering effect will be insufficient. Accordingly, it is preferable that there is at least one pore size distribution peak within a pore size range of 0.8 μm or more and less than 10 μm.

Further, when the proportion of the pores having a pore size of 0.8 μm or more and less than 10 μm in the total pore volume is less than 10 vol %, the infrared scattering effect may be insufficient. Meanwhile, when the proportion is more than 40 vol %, it may be difficult to obtain a porosity of 85 vol % or more.

Further, of the pores of the porous sintered body, pores having a pore size of 0.01 μm or more and less than 0.8 μm (fine pores) occupy 5 vol % or more and 10 vol % or less of the total pore volume.

When such fine pores are present in the above proportion, the number of pores per unit volume can be increased. As a result, the amount of phonon scattering at the grain boundary increases, producing the suppressing effect on heat conduction.

When the proportion of the fine pores in the total pore volume is less than 5 vol %, the number of pores per unit volume is so small that the suppressing effect on heat conduction will be insufficient. Meanwhile, when the proportion is more than 10 vol %, it is difficult to obtain a porosity of 85 vol % or more.

The porous sintered body may have a pore size distribution peak within a pore size range of more than 10 μm. However, coarse pores cause a decrease in heat-insulating properties due to radiant heat transmission. Therefore, for example, the presence of pores having a pore size of more than 1000 μm is undesirable.

The pore size distribution in the porous sintered body is measured in accordance with JIS R 1655, "Test Method for Pore Size Distribution of Fine Ceramic Compact by Mercury Intrusion".

Further, the heat insulator according to one aspect of the present invention has a bulk specific gravity of 0.6 or less. Bulk specific gravity herein is measured in accordance with JIS R 2614, "Measurement Method for Specific Gravity and True Porosity of Insulating Firebrick".

As mentioned above, in the pore configuration where ceramic fibers are contained in $MgAl_2O_4$, the porosity is 85 vol % or more and less than 91 vol %, and pores having a pore size of 0.8 μm or more and less than 10 μm are 10 vol % or more and 40 vol % or less of the total pore volume, while pores having a pore size of 0.01 μm or more and less than 0.8 μm are 5 vol % or more and 10 vol % or less of the total pore volume, because of the presence of the ceramic fibers, weight reduction can be achieved without a decrease in strength, that is, the bulk specific gravity is reduced.

Further, with respect to the heat conductivity of the heat insulator, it is preferable that the heat conductivity of the heat insulator at 1000° C. or more and 1500° C. or less is not more than 1.5 times the heat conductivity at 20° C. or more and less than 1000° C.

In such a heat insulator whose increase in heat conductivity in a high temperature region is suppressed, the heat-insulating effect of the same level as in a low temperature region of less than 1000° C. can be maintained also in a high temperature region of 1000° C. or more.

The heat conductivity of the heat insulator in a high temperature region of 1000° C. or more and 1500° C. or less is 0.45 W/(m·K) or less, specifically 0.40 W/(m·K) or less. In such a heat insulator whose heat conductivity does not increase and is suppressed even in a high temperature region of 1000° C. or more, the heat-insulating effect does not vary much even when used in a high temperature region.

The bulk specific gravity within a range of 0.6 or less herein in not necessarily under the lightweight category as a porous sintered body. However, it is sufficiently lightweight as a heat insulator having the suppressing effect on an increase in heat conductivity of the present invention mentioned above. In addition, because of the moderate bulk specific gravity, strength is ensured, and such a heat insulator is hard to break and thus easy to handle. There is an advantage in this respect. The lower limit of bulk specific gravity is not particularly limited, but should be within a range where the heat insulator can be practically used, and is 0.3 or more, for example.

Next, a heat insulator according to another aspect of the present invention will be described. A heat insulator according to another aspect of the present invention includes a porous sintered body having a porosity of 70 vol % or more and less than 85 vol %, and pores having a pore size of 0.8 μm or more and less than 10 μm occupy 40 vol % or more and less than 70 vol % of the total pore volume, while pores having a pore size of 0.01 μm or more and less than 0.8 μm occupy 10 vol % or more and less than 30 vol % of the total pore volume. The porous sintered body is formed from an $MgAl_2O_4$ (spinel) raw material and ceramic fibers (ceramic fibers are contained in $MgAl_2O_4$). The heat conductivity of the heat insulator at 1000° C. or more and 1500° C. or less is not more than 1.5 times the heat conductivity at 20° C. or more and less than 1000° C.

This heat insulator is different from the heat insulator according to one aspect of the present invention in porosity and also in the volume proportions of pores having a pore size of 0.8 μm or more and less than 10 μm and pores having a pore size of 0.01 μm or more and less than 0.8 μm in all the pores. As a result, because the porosity is lower than the heat insulator according to one aspect of the present invention, although the bulk specific gravity is slightly higher, the heat conductivity can be kept even lower.

This can be particularly attributed to the increase in the proportions of pores having a pore size of 0.01 μm or more and less than 0.8 μm and pores having a pore size of 0.8 μm or more and less than 10 μm as compared with one aspect of the present invention.

Incidentally, the above heat insulator according to another aspect has a heat conductivity of 0.40 W/(m·K) or less, preferably 0.35 W/(m·K) or less, at 1000° C. or more and 1500° C. or less. Alternatively, it is still more preferable that the heat conductivity at 1000° C. or more and 1500° C. or less is not more than 1.2 times the heat conductivity at 20° C. or more and less than 1000° C.

As mentioned above, in the heat insulator according to the present invention, ceramic fibers are added to $MgAl_2O_4$, and further the porosity and the proportions of pores having pore sizes of predetermined ranges are appropriately controlled. As a result, it has been made possible to achieve an arbitrary balance of the suppressing effect on an increase in heat conductivity and weight reduction.

Accordingly, as compared with a former heat insulator formed of $MgAl_2O_4$ alone, material design aimed at improving predetermined characteristics is possible, and a wider variety of requirements can be met.

Incidentally, methods for producing the above heat insulator according to the present invention are not particularly limited, and known porous sintered body production methods can be applied. For example, the pore structure can be formed/adjusted by adding a pore-forming material or a foaming agent, etc.

In addition, various modifications can be made to the heat insulator according to the present invention as long as there is no adverse effect, such as the significant deterioration of heat-insulating characteristics. For example, fibers formed of a plurality of materials may be added. In addition, fine particles may be further added. Alternatively, a region having no fiber may be provided in part. Further, it is also possible to provide various membranes on the surface layer of the heat insulator according to the present invention, thereby further improving the heat resistance.

EXAMPLES

Hereinafter, the present invention will be described in further detail based on examples. However, the present invention is not limited to the following examples.

Examples 1 to 3, Reference Examples 1 and 2, and Comparative Examples 1 to 3

A hydraulic alumina powder (BK-112; manufactured by Sumitomo Chemical Co., Ltd.) and a magnesium oxide powder (MGO11PB; manufactured by Kojundo Chemical Laboratory Co., Ltd.) were mixed in a molar ratio of 11:9. An equal weight of pure water relative to the total weight of hydraulic alumina and magnesium oxide was added thereto and uniformly dispersed to prepare a slurry. Then, alumina fibers, which are bulk fibers having an average diameter of 3 to 5 μm and an average length of 100 mm or less, and an acrylic resin in granular form having an diameter of 5 to 10 μm as a pore-making material were each prepared. The addition rate of the alumina fibers, the diameter and added amount of the pore-making material, the firing temperature, and the firing time were suitably changed to produce the porous sintered bodies having the pore configurations shown in Examples 1 to 3, Reference Examples 1 and 2, and Comparative Examples 3 to 5 in the following Table 1, respectively. Incidentally, the pore-making material was added in an amount within a range of 40 to 70 vol % relative to the slurry, while the alumina fibers were added in an amount as shown in Table 1, and they were mixed and shaped to give a shaped body of 60 mm×70 mm×20 mm. The obtained shaped bodies were fired in the atmosphere while changing the conditions within a range of 1500° C. to 1600° C. and 3 to 4 hours, thereby producing porous sintered bodies.

With respect to the porous sintered bodies obtained above, the crystal phase was identified by X-ray diffraction (X-ray diffractometer: RINT 2500 manufactured by Rigaku Corporation, X-ray source: CuKα, voltage: 40 kV, current: 0.3 A, scattering rate: 0.06°/s). As a result, a magnesia spinel phase was observed.

With respect to the above Examples 1 to 3, Reference Examples 1 and 2, and Comparative Examples 1 to 3, porosity and bulk specific gravity (bulk density) were measured with reference to JIS R 2614, "Measurement Method for Specific Gravity and True Porosity of Insulating Firebrick". The results are shown in Table 1.

In addition, with respect to the above Examples 1 to 3, Reference Examples 1 and 2, and Comparative Examples 1 to 3, pore volumes were measured using a mercury porosimeter (Autopore IV 9500 manufactured by Shimadzu Corporation). FIG. 1 illustrates the pore size distributions of Examples 1 to 3 and Reference Example 1. Based on the pore size distribution, the volume proportions (vol %) of the volume of pores having a pore size of 0.8 μm or more and less than 10 μm and the volume of pores having a pore size of 0.01 μm or more and less than 0.8 μm in the total pore volume were determined.

In addition, for the calculation of the weight ratio of Si relative to Mg in the sintered bodies of the above Examples 1 to 3, Reference Examples 1 and 2, and Comparative Examples 1 to 3, in order to avoid local measurement, the porous sintered bodies were each ground and subjected to fluorescent X-ray measurement.

In addition, with respect to the above Examples 1 to 3, Reference Examples 1 and 2, and Comparative Examples 1 to 3, heat conductivity up to 1500° C. was measured with reference to JIS R 2616 by the hot wire method.

Figure 2:
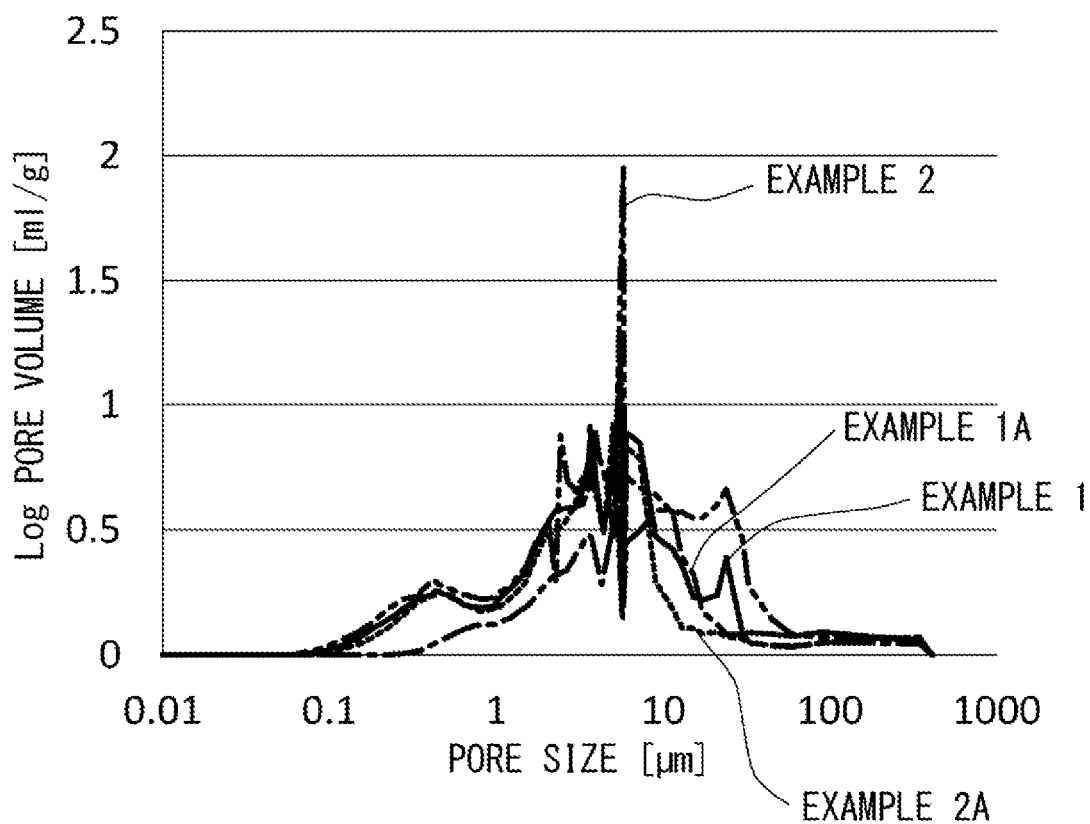
FIG. 2 is a figure showing the pore size distribution of each porous sintered body measured by a mercury porosimeter in Example 1, Example 1A, Example 2, and Example 2A according to the present invention.
Figure 3:
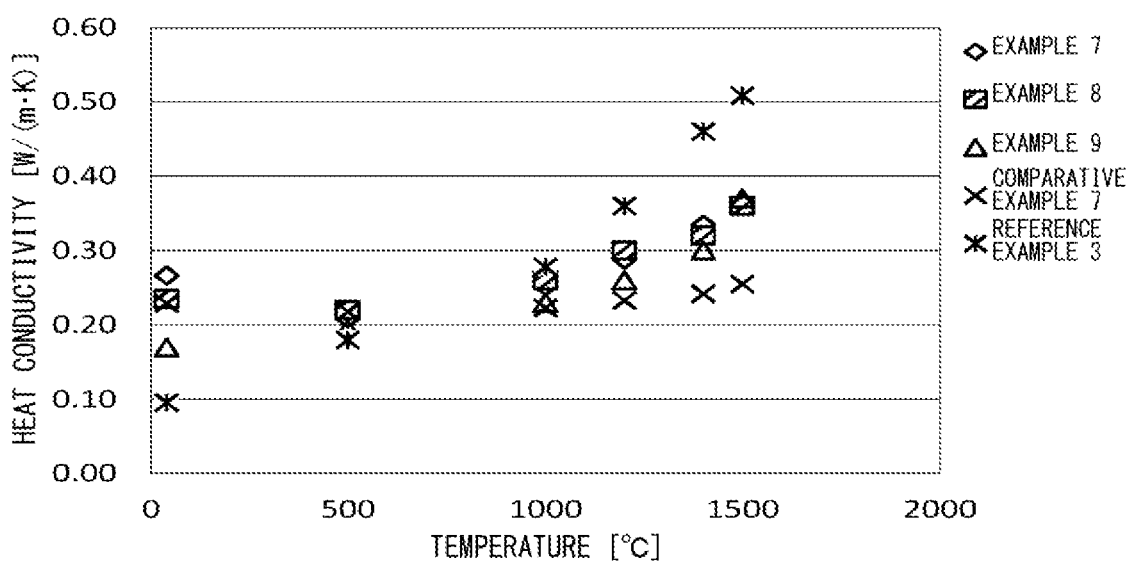
FIG. 3 is a graph showing the relation between temperature and heat conductivity of each porous sintered body or heat-insulating brick in examples according to one aspect of the present invention and a comparative example.

In addition, after-contraction after holding at 1600° C. for 12 hours and cooling was measured with reference to JIS R 2613. Similarly, measurement was also performed after holding at 1700° C. for 12 hours and cooling. In addition, Example 1 was heat-treated at 1700° C. for 12 hours, and the pore size distribution of the resulting Example 1A is shown in FIG. 2. Similarly, Example 2 was heat-treated at 1700° C. for 12 hours, and the pore size distribution of the resulting Example 2A is shown in FIG. 2.

In addition, spalling resistance was measured with reference to JIS R 2657 by the air cooling method at a test temperature of 1000° C., where the condition of the heated surface were examined.

The evaluation results are shown in the following Table 1.

TABLE 1

| | | | Pore Volume Proportion (ml/g) | | Fiber Added | | Heat Conductivity W/(m·K) | | After-contraction | | Spalling Test |
|---|---|---|---|---|---|---|---|---|---|---|---|
| | Porosity | Density g/cm³ | 0.01-0.8 μm | 0.8-10 μm | Amount wt. | Si/Mg wt. | 1000° C. | 1500° C. | 1600° C. × 12 h | 1700° C. × 12 h | The number of tests |
| Example 1 | 77% | 0.75 | 12% | 60% | 5% | 0.81% | 0.24 | 0.27 | 1.1% | 2.1% | After 10 tests, no spalling of ½ or more |
| Example 2 | 81% | 0.68 | 12% | 50% | 10% | less than 0.01% | 0.25 | 0.28 | 0.5% | 1.1% | After 10 tests, no spalling of ½ or more |
| Example 3 | 86% | 0.51 | 5% | 32% | 50% | 12% | 0.25 | 0.34 | 1.1% | 3.5% | After 10 tests, no spalling of ½ or more |
| Reference Example 1 | 75% | 0.76 | 19% | 58% | 0% | less than 0.01% | 0.26 | 0.28 | 0.5% | 1.3% | Spalling of ½ or more in the first test |
| Reference Example 2 | 79% | 0.75 | 15% | 59% | 3% | 0.38% | 0.22 | 0.27 | 1.4% | 3.9% | Spalling of ½ or more in the first test |
| Comparative Example 1 | 68% | 0.98 | 8% | 42% | 30% | 26% | 0.36 | 0.37 | 5.6% | 10.1% | After 10 tests, no spalling of ½ or more |
| Comparative Example 2 | 88% | 0.46 | 5% | 28% | 60% | 18% | 0.28 | 0.38 | 0.9% | 2.8% | After 10 tests, no spalling of ½ or more |
| Comparative Example 3 | 82% | 0.65 | 11% | 52% | 10% | 24% | 0.24 | 0.28 | 6.8% | 12.7% | After 10 tests, no spalling of ½ or more |

As shown in Examples 1 to 3 and Reference Examples 1 and 2 in Table 1, in the case where the weight ratio of Si relative to Mg in the sintered body is 0.15 or less, after-contraction at 1600° C. is 2% or less, and thus low heat conductivity and excellent heat resistance can be obtained. In addition, as shown in Example 2 and Reference Example 1, in the case where the weight ratio of Si relative to Mg in the sintered body is less than 0.0001, after-contraction at 1700° C. is 1.3% or less, and thus even lower heat conductivity and better heat resistance can be obtained.

Incidentally, Reference Examples 1 and 2, where the amount of fibers added is lower than in Examples 1 to 3, are inferior for the reduced spalling resistance, which is likely to be due to the shortage of fibers. In addition, Comparative Examples 1 to 3, where at least one of porosity, fiber added amount, and Si/Mg is outside the range of the present invention, are inferior to Examples 1 to 3 and Reference Examples 1 and 2 in terms of the results of heat conductivity or after-contraction.

Examples 4 to 6, Comparative Examples 4 to 6

A hydraulic alumina powder (BK-112; manufactured by Sumitomo Chemical Co., Ltd.) and a magnesium oxide powder (MGO11PB; manufactured by Kojundo Chemical Laboratory Co., Ltd.) were mixed in a molar ratio of 11:9. An equal weight of pure water relative to the total weight of hydraulic alumina and magnesium oxide was added thereto and uniformly dispersed to prepare a slurry. Then, the diameter and added amount of the pore-making material (acrylic resin in granular form having a diameter 5 to 10 µm) were changed, while firing was performed at a fixed temperature of 1500° C. for 3 hours, thereby producing porous sintered bodies having the pore configurations shown in Examples 4 to 6 and Comparative Examples 4 to 6 in the following Table 2, respectively. Next, using alumina fibers, which are bulk fibers having an average diameter of 3 to 5 µm and an average length of 100 mm or less as a fibrous layer, alumina fibers having the silica weight ratios shown in Examples 4 to 6 and Comparative Examples 4 and 6 in the following Table 2, respectively, were mixed therewith, and the mixtures were each applied to a thickness of 5 mm on one principal surface of each porous sintered body to form a fibrous layer. Subsequently, firing was performed at a fixed temperature of 1500° C. for 3 hours to give a fired body of 25 mm×50 mm×200 mm. Incidentally, the principal surface having the fibrous layer formed thereon is an arbitrary surface of 50 mm×200 mm faces, and Comparative Example 5 does not have a fibrous layer. As above, evaluation samples of heat insulators as shown in Examples 4 to 6 and Comparative Examples 4 to 6 in Table 2, respectively, were produced.

With respect to the porous sintered bodies obtained above, the crystal phase was identified by X-ray diffraction (X-ray diffractometer: RINT 2500 manufactured by Rigaku Corporation, X-ray source: CuKα, voltage: 40 kV, current: 0.3 A, scattering rate: 0.06°/s). As a result, a magnesia spinel phase was observed.

With respect to the above Examples 4 to 6 and Comparative Examples 4 to 6, porosity, pore volume proportions, and heat conductivity were each measured or calculated. The evaluation results are summarized in the following Table 2. Incidentally, the porosity and pore volume proportion were evaluated from a porous sintered body, the silica content was evaluated from a fibrous layer, and the heat conductivity and handleability were evaluated from a heat insulator.

Pore volume was measured based on the above method using a mercury porosimeter (Autopore IV 9500 manufactured by Shimadzu Corporation). Heat conductivity was evaluated with reference to JIS A 1412-2. Handleability was evaluated as follows. With respect to the 200-mm-long side of the fired body of 25 mm×50 mm×200 mm, 50 mm from the end was held and horizontally lifted, and the resulting shape retention was used for evaluation. A rating of ○ was given when the shape was retained, while a rating of X was given to broken ones.

TABLE 2

| | Porous Sintered Body | | | Composite Insulator | | |
| | | Pore Volume Proportion (vol %) | | Fibrous Layer | Heat Conductivity W/(m · K) | | |
| | Porosity | Pore Size: 0.01 µm or more and less than 0.8 µm | Pore Size: 0.8 µm or more and less than 10 µm | Silica Content wt % | at 1000° C. | at 1500° C. | Handleability |
|---|---|---|---|---|---|---|---|
| Example 4 | 78% | 20% | 76% | 5% | 0.22 | 0.25 | ○ |
| Example 5 | 73% | 28% | 54% | 20% | 0.32 | 0.34 | ○ |
| Example 6 | 80% | 15% | 76% | 52% | 0.20 | 0.34 | ○ |
| Comparative Example 4 | 67% | 12% | 76% | 20% | 0.41 | 0.37 | ○ |
| Comparative Example 5 | 78% | 20% | 76% | 0% | 0.22 | 0.24 | x |
| Comparative Example 6 | 74% | 24% | 54% | 60% | — | — | x |

The evaluation results shown in Table 2 show that within the ranges of the present invention, heat conductivity at 1000° C. or more is kept low. It is also shown that handleability is improved as compared with Comparative Example 5, which is a porous sintered body without a fibrous layer, indicating improved toughness.

In contrast, in Comparative Example 4, porosity is lower than the range of the present invention, and also the silica component content of fibers is higher. Thus, a tendency to have high heat conductivity was shown.

In addition, as shown in Comparative Example 5, it can be said that a sample having only a porous layer has poor handleability and is inferior in terms of toughness.

Further, as shown in Comparative Example 6, in the case where fibers having a silica content of more than 55 wt % were used, separation occurred between the porous layer and the fibrous layer. Accordingly, heat conductivity and handleability could not be measured.

The above examples show the case where the porous sintered body is a spinel material formed of $MgAl_2O_4$. However, as mentioned above, in the present invention, the same effect can be obtained also when the spinel material is $ZnAl_2O_4$, $FeAl_2O_4$, $NiAl_2O_4$, or $MnAl_2O_4$. They can be produced in almost the same manner as in the above case of $MgAl_2O_4$, except for using, in order, a porous ceramic raw material having a combination of $ZnO+Al_2O_3$, $Fe_2O_3+Al_2O_3$, $NiO+Al_2O_3$, or $MnO+Al_2O_3$.

Examples 7 to 9, Comparative Example 7

A hydraulic alumina powder (BK-112; manufactured by Sumitomo Chemical Co., Ltd.) and a magnesium oxide powder (MGO11PB; manufactured by Kojundo Chemical Laboratory Co., Ltd.) were mixed in a molar ratio of 11:9. An equal weight of pure water relative to the total weight of hydraulic alumina and magnesium oxide was added thereto and uniformly dispersed to prepare a slurry. Then, alumina fibers, which are bulk fibers having an average diameter of 3 to 5 µm and an average length of 100 mm or less, and an acrylic resin in granular form having an diameter of 5 to 10

μm as a pore-making material were each prepared. The addition rate of the alumina fibers, the diameter and added amount of the pore-making material, the firing temperature, and the firing time were suitably changed to produce the porous sintered bodies having the pore configurations shown in Examples 7 to 9 and Comparative Example 7 in the following Table 3, respectively. Incidentally, the pore-making material was added in an amount within a range of 40 to 70 vol % relative to the slurry, while the alumina fibers were added in an amount of 50 wt %, and they were mixed and shaped to give a shaped body of 60 mm×70 mm×20 mm. The obtained shaped bodies were fired in the atmosphere while changing the conditions within a range of 1500° C. to 1600° C. and 3 to 4 hours, thereby producing porous sintered bodies.

With respect to the porous sintered bodies obtained above, the crystal phase was identified by X-ray diffraction (X-ray diffractometer: RINT 2500 manufactured by Rigaku Corporation, X-ray source: CuKα, voltage: 40 kV, current: 0.3 A, scattering rate: 0.06°/s). As a result, a magnesia spinel phase was observed.

Reference Example 3

A commercially available fibrous insulator (heat resistant temperature: 1600° C.) was used as Reference Example 3.

Figure 4:
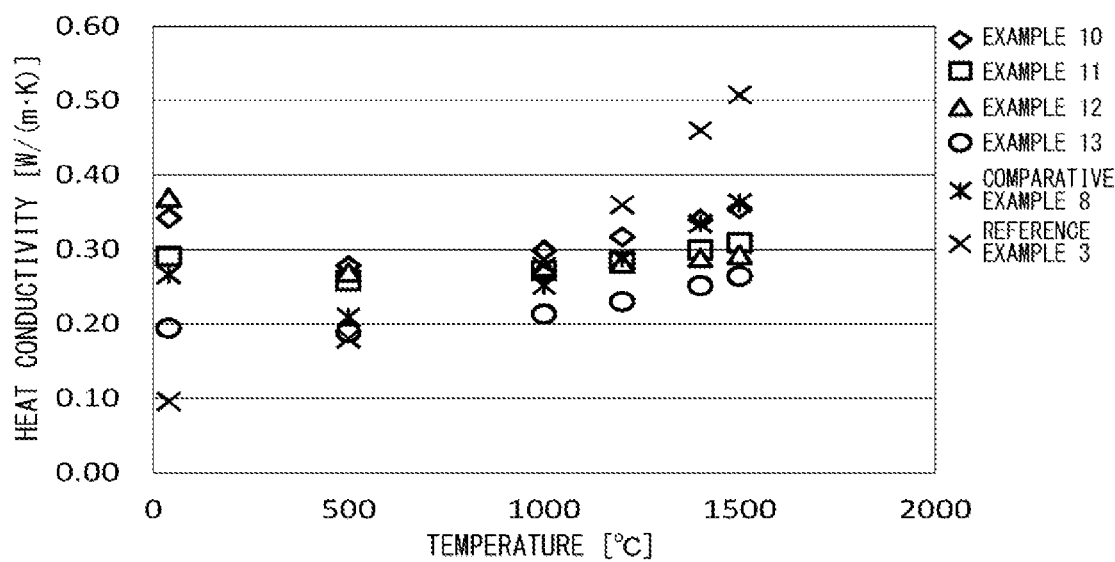
FIG. 4 is a graph showing the relation between temperature and heat conductivity of each porous sintered body or heat-insulating brick in examples according to another aspect of the present invention and a comparative example.
Figure 5:
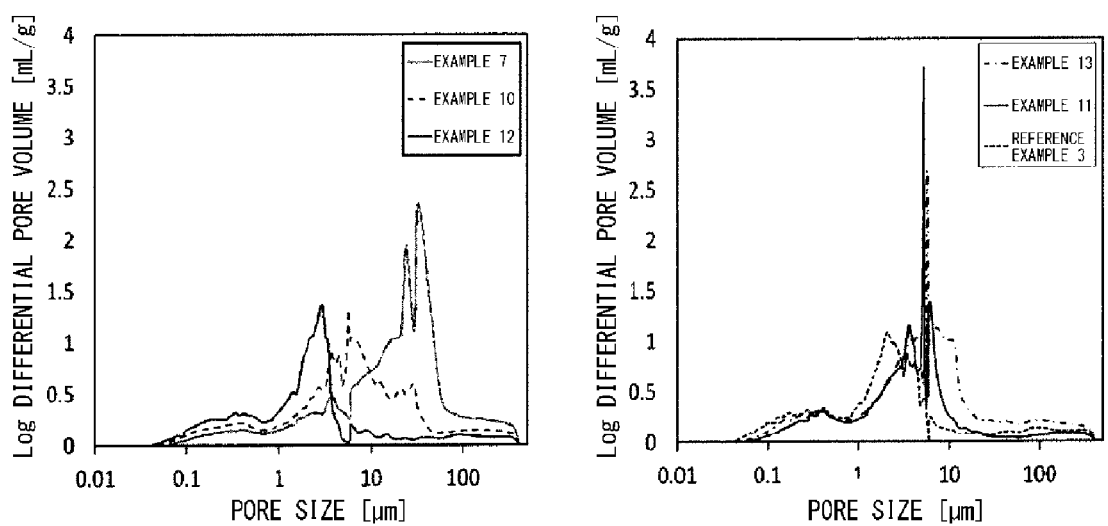
FIG. 5 shows graphs showing the pore size distribution of each porous sintered body measured by a mercury porosimeter in examples according to the present invention and a reference example.

With respect to the above Examples 7 to 9, Comparative Example 7, and Reference Example 3, pore volumes were measured using a mercury porosimeter (Autopore IV 9500 manufactured by Shimadzu Corporation). FIG. 5 shows the pore size distributions. Bulk specific gravity was measured with reference to JIS R 2614, "Measurement Method for Specific Gravity and True Porosity of Insulating Firebrick". In addition, with respect to each porous sintered body or heat-insulating brick of the above examples and comparative examples, heat conductivity was measured with reference to JIS R 2616. For the calculation of the fired body fiber content (vol %), an arbitrary cross-section of each porous sintered body was cleaved and microscopically observed, and the area of fibers in the observation visual field was calculated. For the measurement of the value of fracture energy, a sample was stably fractured at a constant load point displacement rate, and the workload equivalent to the area surrounded by the load-displacement curve and the displacement axis was divided by twice the projected fracture area A measured using an all-purpose projector, etc., thereby calculating the value. The evaluation results are summarized in FIG. 4 and the following Table 3.

TABLE 3

| | Porosity | Bulk Specific Gravity | Fiber Added Amount wt % | Fiber Content of Fired Body | Pore Volume Proportion (vol %) | |
|---|---|---|---|---|---|---|
| | | | | | Pore Size: 0.01 μm or more and less than 0.8 μm | Pore Size: 0.8 μm or more and less than 10 μm |
| Example 7 | 85% | 0.46 | 50% | 25% | 6% | 19% |
| Example 8 | 85% | 0.53 | 58% | 11% | 10% | 39% |
| Example 9 | 90% | 0.37 | 71% | 37% | 5% | 12% |
| Comparative Example 7 | 78% | 0.78 | 0% | 0% | 20% | 75% |
| Reference Example 3 | 92% | 0.25 | — | 80% | 0% | 2% |

| | Heat Conductivity W/(m · K) | | | | | | | Fracture Energy N/m |
|---|---|---|---|---|---|---|---|---|
| | at 1000° C. | at 1200° C. | at 1400° C. | at 1500° C. | min A at 20° C. to 1000° C. | max B at 1000° C. to 1500° C. | B/A | |
| Example 7 | 0.25 | 0.29 | 0.33 | 0.36 | 0.25 | 0.36 | 1.4 | 8.8 |
| Example 8 | 0.26 | 0.30 | 0.32 | 0.36 | 0.26 | 0.36 | 1.4 | 10.5 |
| Example 9 | 0.23 | 0.26 | 0.30 | 0.37 | 0.23 | 0.37 | 1.6 | 17.3 |
| Comparative Example 7 | 0.22 | 0.23 | 0.24 | 0.26 | 0.22 | 0.26 | 1.1 | 0.5 |
| Reference Example 3 | 0.28 | 0.36 | 0.46 | 0.51 | 0.28 | 0.51 | 1.8 | 30.2 |

The evaluation results shown in Table 3 show that in Examples 7 to 9, where fibers are added, and pore volume proportions are within the ranges of one aspect of the present invention, heat conductivity at 1000° C. to 1500° C. is less than 0.40 W/(m·K), and bulk specific gravity is also less than 0.6.

In contrast, in Comparative Example 7 containing no fiber, bulk specific gravity was more than 0.6.

Examples 10 to 13, Comparative Example 8

Porous sintered bodies having the pore configurations shown in Examples 10 to 13 and Comparative Example 8 in the following Table 4, respectively, were produced in the same manner as in Examples 7 to 9, except for suitably changing the addition rate of the alumina fibers, the diameter and added amount of the pore-making material, the firing temperature, and the firing time, and they were evaluated.

Further, Examples 7 to 13 and Comparative Examples 7 and 8 were measured for the value of fracture energy, and comparison was made. For the measurement of the value of fracture energy, a sample was stably fractured at a constant load point displacement rate, and the workload equivalent to the area surrounded by the load-displacement curve and the displacement axis was divided by twice the projected fracture area A measured using an all-purpose projector, etc., thereby calculating the value.

The results were as follows: 8.8 N/m in Example 7, 10.5 N/m in Example 8, 17.3 N/m in Example 3, 4.7 N/m in Example 10, 5.2 N/m in Example 11, 1.7 N/m in Example 12, and 4.3 N/m in Example 13. In contract, the results were 0.5 N/m in Comparative Example 7 and 8.7 N/m in Comparative Example 8.

From the above results, the values of fracture energy in Examples 7 to 13, where fibers according to the present invention are added, were higher than in Comparative

TABLE 4

| | Porosity | Bulk Specific Gravity | Fiber Added Amount wt % | Fiber Content of Fired Body | Pore Volume Proportion (vol %) | |
|---|---|---|---|---|---|---|
| | | | | | Pore Size: 0.01 μm or more and less than 0.8 μm | Pore Size: 0.8 μm or more and less than 10 μm |
| Example 10 | 74% | 0.81 | 20% | 3% | 13% | 48% |
| Example 11 | 79% | 0.78 | 20% | 5% | 18% | 68% |
| Example 12 | 72% | 0.92 | 5% | 0.5% | 24% | 61% |
| Example 13 | 83% | 0.62 | 10% | 8% | 14% | 52% |
| Comparative Example 7 | 86% | 0.46 | 50% | 26% | 6% | 19% |
| Reference Example 3 | 92% | 0.25 | — | 80% | 0% | 2% |

| | Heat Conductivity W/(m · K) | | | | | | | Fracture Energy N/m |
|---|---|---|---|---|---|---|---|---|
| | at 1000° C. | at 1200° C. | at 1400° C. | at 1500° C. | min A at 20° C. to 1000° C. | max B at 1000° C. to 1500° C. | B/A | |
| Example 10 | 0.30 | 0.32 | 0.34 | 0.36 | 0.30 | 0.36 | 1.2 | 4.7 |
| Example 11 | 0.27 | 0.28 | 0.30 | 0.31 | 0.27 | 0.31 | 1.1 | 5.2 |
| Example 12 | 0.28 | 0.28 | 0.29 | 0.29 | 0.28 | 0.29 | 1.1 | 1.7 |
| Example 13 | 0.21 | 0.23 | 0.25 | 0.26 | 0.21 | 0.26 | 1.2 | 4.3 |
| Comparative Example 7 | 0.25 | 0.29 | 0.33 | 0.36 | 0.25 | 0.36 | 1.4 | 8.7 |
| Reference Example 3 | 0.28 | 0.36 | 0.46 | 0.51 | 0.28 | 0.51 | 1.8 | 30.2 |

The evaluation results shown in FIG. 5 and Table 4 show that in Examples 10 to 13, where fibers are added, and porosity and pore volume proportions are within the ranges of another aspect of the present invention, heat conductivity at 1000° C. to 1500° C. is sufficiently low.

Further, in Examples 12 to 13, heat conductivity at 1000° C. to 1500° C. is even lower, which is more preferable.

In contrast, in Comparative Example 8, where porosity and pore volume proportions are outside the ranges of another aspect of the present invention, heat conductivity at 1000° C. to 1500° C. was slightly higher.

Incidentally, Reference Example 3 is a heat insulator made only of fibers. The bulk specific gravity thereof is much lower than the products of the present invention. However, heat conductivity at 1000° C. to 1500° C. in Reference Example 3 is 0.51 W/(m·K).

From this, it can be said that the heat insulator according to the present invention is more suitable particularly for the purpose that focuses on the characteristics of low heat conductivity in a high temperature region and a suppressed increase in the heat conductivity.

Example 7, where fibers are not added. Incidentally, in Comparative Example 8 having a porosity of more than 85 vol % beyond the range of the porous sintered body according another aspect of the present invention, an increase in heat conductivity at 1000° C. to 1500° C. is greater than in Examples 10 to 13. Thus, it can be said that the advantage of the present invention in that excellent heat-insulating properties at high temperatures can be obtained was not sufficiently obtained.

Incidentally, although alumina fibers have been mentioned as fibers to be added in the above examples, when silica is contained in the fibers for use in the present invention, the heat resistance and heat-insulating properties of the entire porous sintered body are reduced. Also in the case of using other kinds of fibers than alumina fibers, it is preferable that the silica content of the fibers is 5 wt % or less. As a result, contraction is suppressed not only in the production of a porous sintered body but also in the course of use at high temperatures, and the desired pore size distribution can be maintained. That is, by using fibers having a silica content of 5 wt % or less, a porous sintered body having excellent heat resistance and heat-insulating properties can be achieved.

What is claimed is:

1. A heat insulator comprising a porous sintered body having a porosity of 70 vol % or more and less than 91 vol %,
pores having a pore size of 0.8 μm or more and less than 10 μm occupying 10 vol % or more and 70 vol % or less of the total pore volume, while pores having a pore size of 0.01 μm or more and less than 0.8 μm occupying 5 vol % or more and 30 vol % or less of the total pore volume,
the porous sintered body being formed from an $MgAl_2O_4$ and fibers formed of an inorganic material,
the heat conductivity of the heat insulator at 1000° C. or more and 1500° C. or less being 0.40 W/(m·K) or less, and
the weight ratio of Si relative to Mg in the porous sintered body being 0.15 or less.

2. The heat insulator according to claim 1, wherein the weight ratio of Si relative to Mg in the porous sintered body is 0.0001 or less.

3. The heat insulator according to claim 1, wherein
the porosity is 85 vol % or more and less than 91 vol %, and
pores having a pore size of 0.8 μm or more and less than 10 μm occupy 10 vol % or more and 40 vol % or less of the total pore volume, while pores having a pore size of 0.01 μm or more and less than 0.8 μm occupy 5 vol % or more and 10 vol % or less of the total pore volume.

4. The heat insulator according to claim 2, wherein
the porosity is 85 vol % or more and less than 91 vol %, and
pores having a pore size of 0.8 μm or more and less than 10 μm occupy 10 vol % or more and 40 vol % or less of the total pore volume, while pores having a pore size of 0.01 μm or more and less than 0.8 μm occupy 5 vol % or more and 10 vol % or less of the total pore volume.

5. The heat insulator according to claim 1, wherein
the porosity is 70 vol % or more and less than 85 vol %, and
pores having a pore size of 0.8 μm or more and less than 10 μm occupy 40 vol % or more and 70 vol % or less of the total pore volume, while pores having a pore size of 0.01 μm or more and less than 0.8 μm occupy 10 vol % or more and 30 vol % or less of the total pore volume.

6. The heat insulator according to claim 2, wherein
the porosity is 70 vol % or more and less than 85 vol %, and
pores having a pore size of 0.8 μm or more and less than 10 μm occupy 40 vol % or more and 70 vol % or less of the total pore volume, while pores having a pore size of 0.01 μm or more and less than 0.8 μm occupy 10 vol % or more and 30 vol % or less of the total pore volume.

7. The heat insulator according to claim 1, wherein the inorganic material is ceramic fibers.

8. A method for producing a heat insulator comprising a porous sintered body having a porosity of 70 vol % or more and less than 91 vol %,
pores having a pore size of 0.8 μm or more and less than 10 μm occupying 10 vol % or more and 70 vol % or less of the total pore volume, while pores having a pore size of 0.01 μm or more and less than 0.8 μm occupying 5 vol % or more and 30 vol % or less of the total pore volume,
the porous sintered body being formed from an $MgAl_2O_4$ and ceramic fibers,
the heat conductivity of the heat insulator at 1000° C. or more and 1500° C. or less being 0.40 W/(m·K) or less, and
the weight ratio of Si relative to Mg in the porous sintered body being 0.15 or less,
the method comprising a step of adding the ceramic fibers having a silica content of 5 wt % or less to an aqueous slurry comprising alumina powder and magnesium oxide powder, and firing the resulting mixture to form the porous sintered body wherein the ceramic fibers are present in an amount of 0.5 wt % or more and less than 60 wt % of the porous sintered body.

9. A heat insulator comprising a porous sintered body having a porosity of 85 vol % or more and less than 91 vol %,
pores having a pore size of 0.8 μm or more and less than 10 μm occupying 10 vol % or more and 40 vol % or less of the total pore volume, while pores having a pore size of 0.01 μm or more and less than 0.8 μm occupying 5 vol % or more and 10 vol % or less of the total pore volume,
the porous sintered body being formed from an $MgAl_2O_4$ and ceramic fibers,
the heat conductivity of the heat insulator at 1000° C. or more and 1500° C. or less being 0.40 W/(m·K) or less, and
the bulk specific gravity of the heat insulator being 0.6 or less.

10. The heat insulator according to claim 9, wherein the heat conductivity at 1000° C. or more and 1500° C. or less is not more than 1.5 times the heat conductivity at 20° C. or more and 1000° C. or less.

11. A heat insulator comprising a porous sintered body having a porosity of 70 vol % or more and less than 85 vol %,
pores having a pore size of 0.8 μm or more and less than 10 μm occupying 40 vol % or more and less than 70 vol % of the total pore volume, while pores having a pore size of 0.01 μm or more and less than 0.8 μm occupying 10 vol % or more and less than 30 vol % of the total pore volume,
the porous sintered body being formed from an $MgAl_2O_4$ and ceramic fibers, and
the heat conductivity of the heat insulator at 1000° C. or more and 1500° C. or less being not more than 1.5 times the heat conductivity at 20° C. or more and less than 1000° C.

* * * * *